Dec. 17, 1957  B. R. ANKERSEN  2,816,849
FURNACES AND METHODS OF HEATING
Filed Dec. 24, 1956  4 Sheets-Sheet 1

INVENTOR.
BORGE RICHARD ANKERSEN

Dec. 17, 1957     B. R. ANKERSEN     2,816,849

FURNACES AND METHODS OF HEATING

Filed Dec. 24, 1956     4 Sheets-Sheet 2

INVENTOR.
BORGE RICHARD ANKERSEN

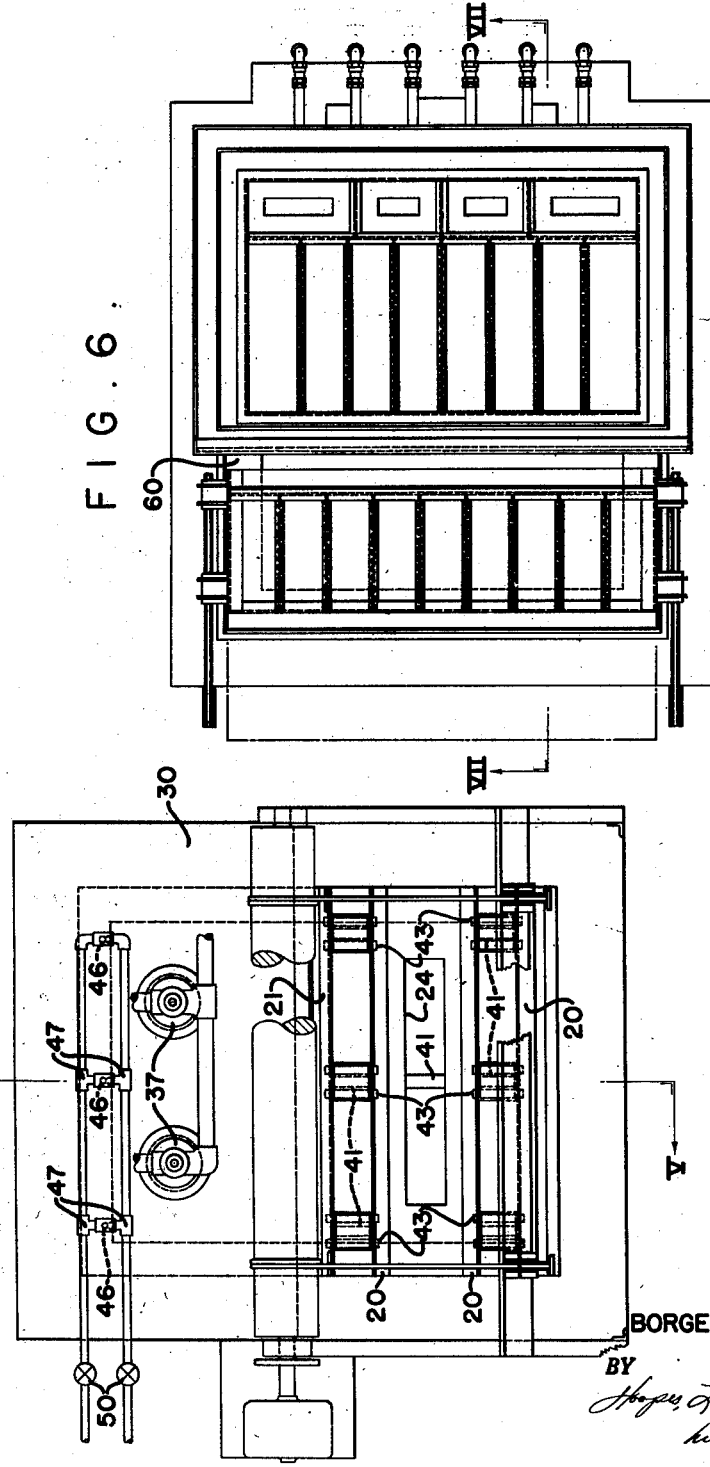

Dec. 17, 1957  B. R. ANKERSEN  2,816,849
FURNACES AND METHODS OF HEATING
Filed Dec. 24, 1956  4 Sheets-Sheet 4

*INVENTOR.*
BORGE RICHARD ANKERSEN
BY
*his attorneys*

United States Patent Office 2,816,849
Patented Dec. 17, 1957

2,816,849

FURNACES AND METHODS OF HEATING

Borge Richard Ankersen, Butler, Pa.

Application December 24, 1956, Serial No. 630,213

14 Claims. (Cl. 148—13.1)

This invention relates to furnaces and methods of heating and particularly to that class of furnaces using a bath of salt as the treating medium.

Salt bath furnaces have long been used for heating metal objects. They have, however, been expensive and not completely satisfactory for a variety of reasons. Salt bath furnaces heretofore proposed have been of two general types: (1) those using electrodes immersed in the salt and (2) those in which the salt is heated by conduction of the heat through an immersed metal tube into which the flame is impinged. In the case of electrode heated salt baths the electrodes are expensive and are rapidly eroded making the practice expensive. Where the salt is heated by conduction through a metal pot or immersion tubes in the salt they become contaminated by the metal and perhaps more important, the amount of conduction and the rate of corrosion are so related that it becomes impossible to transfer enough heat into the salt bath to successfully treat at high temperatures.

I have discovered a furnace and a method of heat treating which overcomes these problems which have heretofore faced the heat treating art.

I provide a method of heating metal objects out of contact with flame and oxidizing gases. I provide a means and method of transferring heat from a flame to a pool of molten salt, then transferring the heated salt to a treating pool for heating metal out of contact with the flame and oxidizing gases, and returning cool salt from the treating pool to the heating pool. Preferably the transfer is simply by convection. Preferably I transfer heat directly from a flame to a portion of a bath of molten salt and heat a metal object by submersion in an adjacent portion of the bath of molten salt, all the while maintaining the object out of contact with the flame and the combustion gases.

I provide preferably a refractory salt bath container, a cover forming a combustion chamber over a portion of the refractory container, a burner in said combustion chamber preferably adapted to direct the flame against the roof and side walls of the combustion chamber and a removable cover over the balance of the container forming therewith a covered treating box. Means such as baffles are provided for restricting the combustion flame to the combustion chamber.

I have set out certain objects, advantages and purposes of this invention in the foregoing general statement. Other objects, advantages and purposes of this invention will be apparent from a consideration of the following description and the accompanying drawings in which Figure 1 is a plan view of the preferred embodiment of a furnace according to my invention.

Figure 2 is a section on the line 2—2 of Figure 1.

Figure 4 is a plan view of a second embodiment of my invention.

Figure 5 is a section on the line 5—5 of Figure 4.

Figure 6 is a plan view of a third embodiment of my invention and

Figure 3:
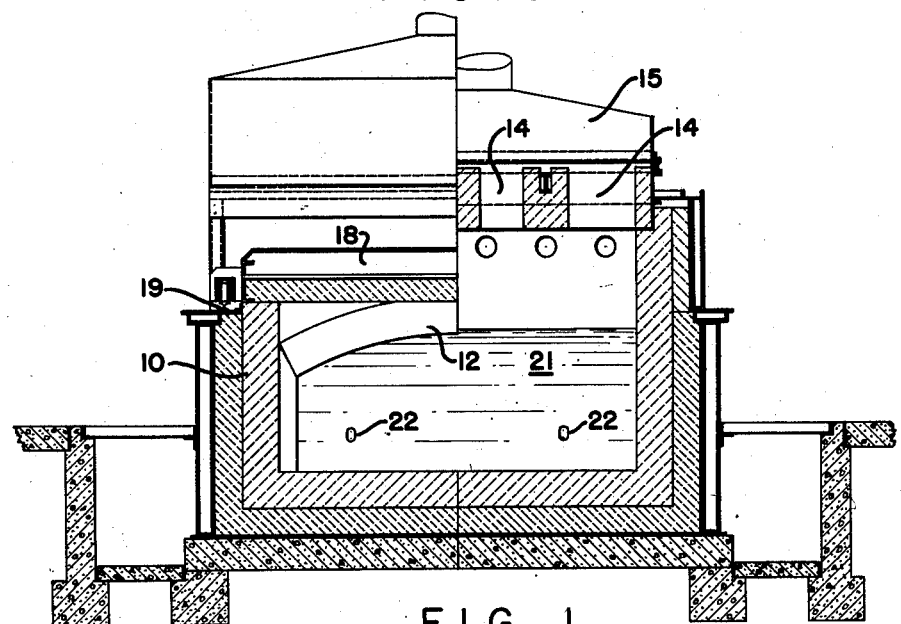
Figure 3 is a section on the line 3—3 of Figure 1.

Referring to the drawings, I have illustrated a refractory container 10 of generally rectangular shape. A combustion chamber 11 is formed along one side of the container 10 by an arch wall 12 and vertical extensions of the container walls 10a, 10b and 10c. A removable cover 13 rests on the arch wall 12 and vertical extensions in the container walls 10a, 10b and 10c forming the completed combustion chamber. A vent 14 is provided in the cover or roof 13 to carry combustion gases out of the combustion chamber into a stack 15. Gas burners 16 are mounted in ports 17 in the combustion chamber 11 and are directed to impinge against the roof or cover 13 so as to radiate the heat downwardly towards the bottom of the container 10.

A sliding cover 18 is provided over the portion of the container not included within the chamber 11. The cover 18 is slidable on rails 19 onto a holding platform 20 so as to open the entire area of the container outside of the combustion chamber. A salt bath 21 is provided in the container extending from beneath the combustion chamber 11 through the arch wall 12 into the portion of the container included under the cover 18. The bath 21 is heated until molten and is retained in the molten condition by the reflected heat from the roof 13. The heat is reflected and impinged directly against the surface of the salt without any interposed metallic heat conductor. This causes a transfer of heat from the flame into the salt 21 at a rate much higher than is possible by convection through a metal plate in contact with the salt as has been practiced in the past. This increased rate of heating and of heat transfer appears to be a function of the translucency and conductivity of the molten bath resulting in the more rapid absorption of heat from the flame.

Articles which are to be heated are inserted into the salt bath through the opening formed by moving cover 18 onto the supporting platform 20. Articles in the bath 21 are never in contact with the heating flame or with the combustion gases, and since the heat transfer rate from the flame into the molten bath is much higher and more effective than any thing heretofore available, the resulting heat transfer to the object being treated is likewise higher, thus producing substantial savings in time and efficiency as well as producing articles whose surfaces are in better condition than those heated in the presence of the combustion flame.

Air injector pipes 22 may be placed in the walls of container 10 to inject air into the molten salt bath to cause the bath to move and thereby eliminate any possibility of non-uniform heating and "dead spots" in the bath.

In Figures 4 and 5 I have illustrated a second embodiment of my invention. In this embodiment I provide a container 30 preferably of rectangular shape formed of suitable refractory material. The container 30 rests on I-beams 31. An open bottom housing 32 formed in part by extending upwardly the rear end wall and adjoining portions of the side walls of the container and connecting these by a vertical wall 33 that projects into the container a short distance, a removable roof member 34 completes the housing and forms a combustion chamber 35. A roof 34 is provided with one or more burner ports 36 provided with burner nozzles 37 directed downwardly towards the bottom of the container 30. Each burner is connected with fuel supply lines in conventional manner.

The portion of the container 30 which is not covered by the housing forms a treating area in which work is heated by molten salt 38. This treating portion is normally closed by a refractory cover 39 having two rows of vertical slots 40 through which the upper ends of U-shaped angles 41 extend. The U-shaped angles are provided with T-shaped ends supported by pin 43 extending through parallel short angle irons 20 and a channel 21 mounted on top of the cover. The hangers are preferably made of refractory material and may support refractory bars 44 which hold the work 45 indicated in broken lines in Figure 5. A slot 24 is formed in the refractory cover 39 to permit exhausting the combustion gases from the combustion chamber.

The downward impingement of the flame and heat on the salt bath causes the bath to move and convey the heat imparted from the flame into the treating portion of the bath and to transmit heat from the flame to the object to be treated at a rate far in excess of that possible by other salt bath arrangements without the possibility of having the flame or combustion gases come in contact with the object to be heated.

Embedded in the rear wall of the furnace are a plurality of vertical pipes 46, the lower ends of which are turned forward into the lower part of the container 30. The upper ends of the pipes are provided with Ts 47 that are connected to pipes 48 and 49 with sources of air and combustible gas, respectively, not shown. Each of these pipes is provided with a valve 50 so that either the air or the gas alone, or any desired mixture of them can be directed into the molten salt continuously. In this manner the character of the salt bath can be controlled, because oxygen can be introduced into it or burned out of it without the necessity for adding chemicals for that purpose.

Figure 1:
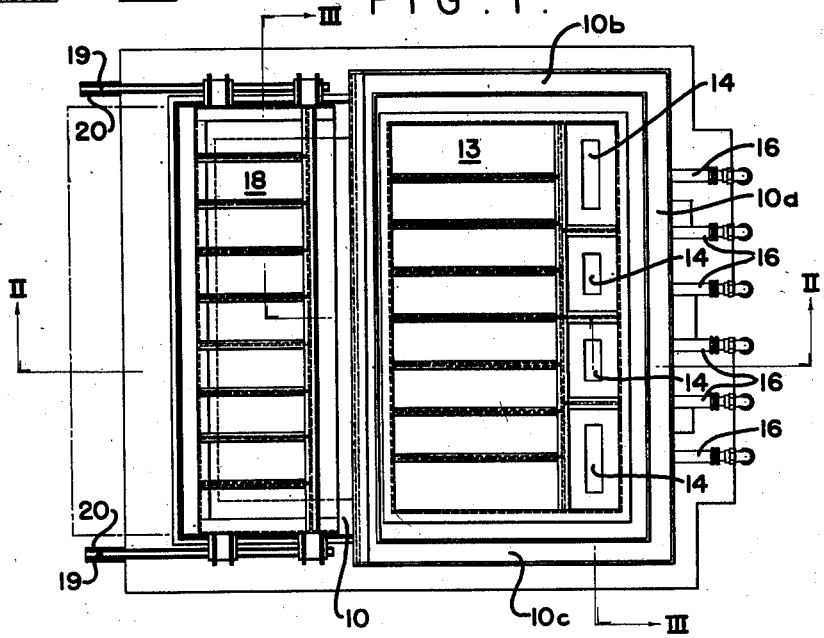
Figure 7:
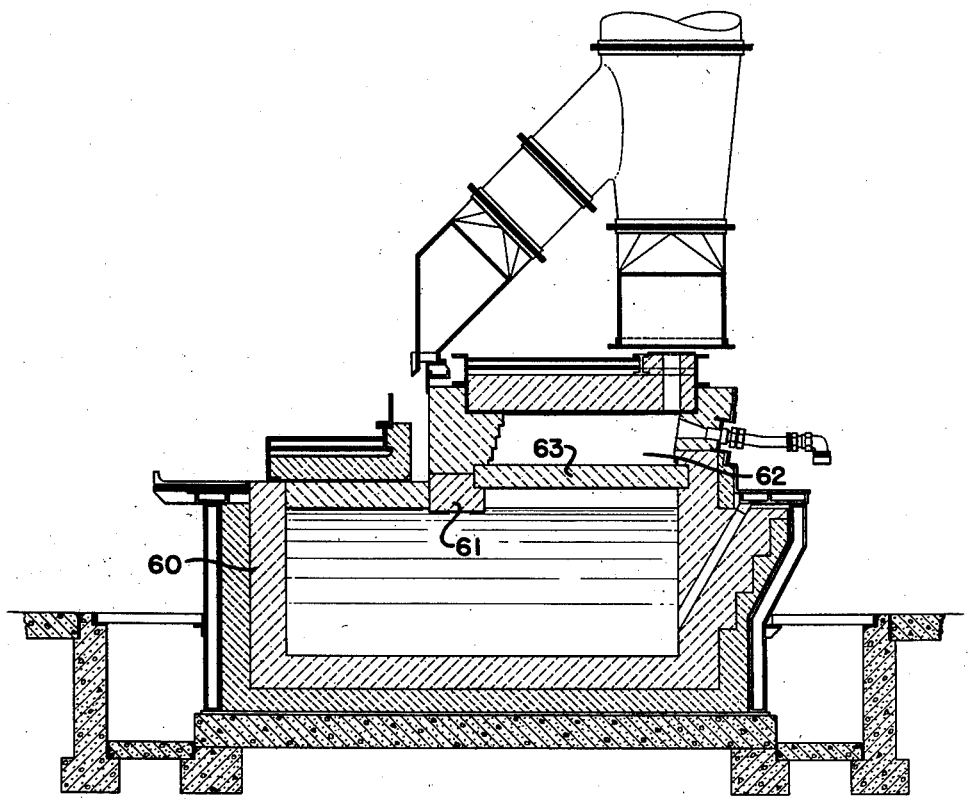
Figure 7 is a section on the line 7—7 of Figure 6.

In Figures 6 and 7 I have illustrated a third embodiment of my invention. In this embodiment I provide a container 60 similar to container 10 of Figures 1 through 3. Structurally the assembly is similar to that of Figures 1 through 3 including an arch wall 61 and vertical extensions of the sidewalls of container 60 forming a combustion chamber 62 along one side of the container. In the embodiment of Figures 6 and 7, however, I provide in the combustion chamber 62, intermediate the top and bottom a ceramic plate 63 which is heated to incandescence by the flame in the combustion chamber. The radiant heat from the incandescent plate 63 strikes the salt bath and is absorbed therein. The ceramic plate 63 prevents the combustion gases from reaching the salt and thus eliminates any possibility of salt contamination from the products of combustion.

The method and apparatus of the present invention are capable of accomplishing surprising results in effectiveness and economy. This is in large part because substantially all of the heating value of the burner flame can be transmitted into the salt bath whereas in conventional methods of heating a large part of the heating is lost and there is always present the likelihood of contamination from the metal holding pots or vats. Salt baths according to my invention may be heated to temperatures above 2,000° F. without difficulty and I have been able to maintain temperatures in the neighborhood of 2,400° F. Conventional gas-fired salt bath furnaces are limited to temperatures in the neighborhood of 1600°–1700° F.

While I have described and illustrated certain preferred embodiments of my invention, it will be understood that the invention may be otherwise embodied within the scope of the following claims.

I claim:

1. A salt bath furnace comprising a refractory pot having a heating portion at one end and a treating portion at the opposite end, a bath of salt in said pot below the level of the top of the pot, a removable cover for said treating portion to permit insertion and removal of solid metal articles to be heated, an open-bottom housing covering said heating portion and forming a combustion chamber communicating at its bottom with the upper part of said treating portion of the pot, and a burner mounted at the top of said housing in position to direct its flame downward toward the upper surface of the bath of salt, the opposite end of the furnace being provided with an outlet for combustion gases from the burner.

2. A salt bath furnace comprising a refractory pot having a heating portion at one end and a treating portion at the opposite end, a bath of salt in said pot below the level of the top of the pot, a removable cover for said treating portion to permit insertion and removal of solid metal articles to be heated, an open-bottom housing covering said heating portion and forming a combustion chamber communicating at its bottom with the upper part of said treating portion of the pot, the top of the housing being provided with a vertical burner port, and a burner mounted on top of the housing in position to direct its flame down through said port onto the upper surface of the bath of salt, the opposite end of the furnace being provided with an outlet for comubstion gases from the burner.

3. A salt bath furnace comprising a refractory pot having a heating portion at one end and a treating portion at the opposite end, a bath of salt in said pot below the level of the top of the pot, a vertically removable cover for said treating portion, hanger means suspended from the cover and adapted to support work in the pot, an open-bottom housing covering said heating portion and forming a combustion chamber communicating at its bottom with the upper part of said treating portion of the pot, and a burner mounted at the top of said housing in position to direct its flame downward toward the upper surface of the bath of salt, the opposite end of the furnace being provided with an outlet for combustion gases from the burner.

4. The method of heat treating a metal article, comprising melting an entire salt bath by directing the heat from a flame onto the upper surface of the salt bath to heat and melt it, restricting said flame and accompanying combustion gases to a portion of said surface, and immersing said article in the molten salt in the portion of the bath outside the restricted surface area, while continuing to heat the salt with the flame.

5. The method of heat treating a metal article, comprising melting an entire salt bath by directing the heat from a flame onto the upper surface of a body of salt to heat and melt it, restricting said flame and accompanying combustion gases to a portion of said surface, immersing said article in the molten salt at a point spaced laterally from said flame and outside the restricted surface area, and directing a gas into the molten salt bath beneath the flame to cause the salt to circulate from the restricted area to the article immersion area.

6. The method of transmitting a very high temperature from a flame to a metal article without scaling the article, comprising melting an entire salt bath by directing the flame onto the upper surface of the salt bath to heat and melt it, restricting said flame and accompanying gases to a portion of said surface introducing said article into the molten salt outside the restricted area in a location substantially free of combustion gases, and continuing to heat the salt with said flame until said article has absorbed the desired amount of heat from the salt.

7. The method of heating a metal article to a temperature in excess of 1800° F. without producing scale on the article, comprising melting an entire salt bath by directing the heat from a flame onto the upper surface of the salt bath to heat and melt it, restricting said flame and accompanying combustion gases to a portion of said surface immersing said article in the molten salt in a location spaced laterally from the flame and outside the restricted surface area, and continuing to heat the salt with said flame until it has transferred enough heat from the flame to said article to raise the temperature of the article above 1800° F.

8. A salt bath furnace comprising a container for molten salt, a bath of salt in said container, means including a cover forming a combustion chamber over a portion of said container and over a portion of the upper surface of the bath of salt, burner means in said chamber, and means restricting the flame and combustion gases within said cover over said portion of the upper surface of the bath of salt.

9. A salt bath furnace comprising a container for molten salt, a bath of salt in said container, means including a first cover forming a combustion chamber over a portion of said container, burner means in said chamber, second removable cover means over the portion of the container not within the first cover and forming an access into the salt bath outside the first cover and means restricting the flame and combustion gases from the burner within the combustion chamber onto the upper surface of the bath of salt within the cover means whereby the portion of salt beneath the second cover means remains untouched by flame or combustion gases.

10. A method of transmitting high temperatures from a flame to a metal article comprising the steps of melting an entire salt bath mass by directing the heat from a flame directly onto a restricted portion of the upper surface of said bath, and introducing the article to be heated into the molten bath in a portion not directly heated by the flame all the while restricting the flame and products of combustion from the portion of bath receiving the article to be heated.

11. A method of transmitting high temperature from a flame to a metal article comprising the steps of melting an entire salt bath mass by heating a restricted portion of the upper surface of the bath surface by a direct flame, introducing an article to be heated in a portion of the bath not directly heated by the flame, all the while restricting the flame and products of combustion from the portion of bath receiving the article to be heated and introducing a gas under pressure into the bath so as to cause the salt from the portion of the bath in contact with the flame to move into the article treating portion of the bath and force that portion of the bath into contact with the flame whereby a continuous heat exchange is provided.

12. A method of transferring heat from a flame to a metal object through a molten bath of salt comprising the steps of melting an entire salt bath mass by directly heating the upper surface of a molten pool of salt with a flame thereby forming a heating pool, transferring the molten salt from the heating pool to an adjacent treating pool out of contact with the flame and oxidizing gases and in contact with the metal to be heated, and returning cooled salt from the treating pool to the heating pool.

13. A salt bath furnace comprising a refractory pot having a heating portion at one end and a treating portion at the opposite end, a bath of salt in said pot below the level of the top of the pot, a housing covering said heating portion and forming a combustion chamber communicating at its bottom with the upper part of said treating portion of the pot, a heat radiating plate in the bottom of the housing overlying and spaced from the top of the salt and burner means mounted in the housing adapted to heat said plate whereby heat is transferred by radiation from the plate to the surface of the salt and outlet means in the housing for removing combustion gases.

14. A salt bath furnace as claimed in claim 13 wherein the heat radiating plate is a ceramic refractory plate.

References Cited in the file of this patent

UNITED STATES PATENTS

| | | |
|---|---|---|
| 1,080,113 | Von Kugelgen | Dec. 2, 1913 |
| 2,204,051 | Ritts et al. | June 11, 1940 |